United States Patent [19]

Ruiz et al.

[11] E Re. 30,222

[45] Reissued Feb. 26, 1980

[54] DOUGH SHEET SPREADER

[75] Inventors: Edward F. Ruiz, 959 W. Covina Blvd., San Dimas, Calif. 91773; Isabel L. Moreno, Oceanside, Calif.

[73] Assignee: Edward F. Ruiz, San Dimas, Calif.

[21] Appl. No.: 852,364

[22] Filed: Nov. 17, 1977

Related U.S. Patent Documents

Reissue of:

[64] Patent No.: 3,748,079
Issued: Jul. 24, 1973
Appl. No.: 66,734
Filed: Aug. 25, 1970

[51] Int. Cl.[2] ..... A21C 3/04

[52] U.S. Cl. ..... 425/190; 425/376 R; 425/466

[58] Field of Search ..... B28B/21/52; 425/192 R, 425/190, 200, 208, 168, 181, 194, 363, 367, 376, 380, 381, 465, 466, 461, 472, 812, 377

[56] References Cited

U.S. PATENT DOCUMENTS

| | | | |
|---|---|---|---|
| 909,957 | 1/1909 | Staude | 83/116 |
| 1,880,110 | 9/1932 | Shapiro | 425/294 X |
| 2,699,737 | 1/1955 | Sticelber | 425/363 |
| 2,737,130 | 3/1956 | Rhodes | 425/367 |
| 2,774,106 | 12/1956 | Bethe | 425/461 X |
| 2,814,260 | 11/1957 | Morgan | 425/363 X |
| 2,924,184 | 2/1960 | Welch | 425/363 X |
| 2,960,044 | 11/1960 | Anetsberger | 425/363 X |
| 2,965,926 | 12/1960 | Von Haase | 425/382 |
| 3,255,488 | 6/1966 | Waldherr | 425/466 |

*Primary Examiner*—William R. Briggs
*Attorney, Agent, or Firm*—Edward O. Ansell

[57] ABSTRACT

A dough sheet spreader through which dough is extruded in sheets of predetermined width and thickness. A multi-part housing having a downwardly distending, outwardly flaring passageway terminating in an egress, the lips of which are lined with dough release members, is adapted to receive and extrude dough-like material. Provision may be made for degassing the dough during the extrusion process. In one embodiment the thickness of the dough sheet can be varied and in another, both the width and thickness can be varied in progressive, finite steps.

2 Claims, 9 Drawing Figures

DOUGH SHEET SPREADER

Matter enclosed in heavy brackets [ ] appears in the original patent but forms no part of this reissue specification; matter printed in italics indicates the additions made by reissue.

This application and copending application Ser. No. 852,363 are divisional reissues of U.S. Pat. No. 3,748,079.

BACKGROUND OF THE INVENTION

FIELD OF THE INVENTION

The present invention relates to dough sheet spreaders, particularly for the processing of yeast dough, pizza crust, flour tortilla, noodles, macaroni and biscuits. It is also extended to means for processing the dough during extrusion to improve the texture and quality and extend the usable storage life before consumption.

DESCRIPTION OF THE PRIOR ART

The spreader of the present invention is adapted to be used with screw type dough mixing and kneading machines of the type shown in Patent 2,068,220 to Baechi. In that system, the screw conveyor feeds the dough through a sizing plate at right angles to the screw. Similarly, Patent No. 2,543,198 to Plunguian et al relates to a mixing apparatus having a cylindrical shell through which the processed material is fed by means of a helical conveyor. The material is moved into the discharge hopper which is arranged at the end of the passageway. Patent No. 2,209,824 to Louisot et al relates to a meat processing machine for shaping fat or other products into a strip of substantially uniform thickness and width. The meat is fed through a cylindrical housing for the feed screw of an ordinary meat chopping machine which has a funnel arranged at the end. The mouth of the funnel is substantially circular in cross-section but the walls of the funnel taper to provide a discharge opening of modified oval shape. In communication with the funnel is a passageway of upper members and lower members which together form a shaping passageway having an outlet opening of substantially rectangular cross-section. Patent No. 3,332,369 to Freed relates to a bread dough making machine having a hopper and feed screw conveyor which feeds into a loaf forming block through which the developed dough is extruded.

In each of these and other systems, it was not practical to produce dough sheets of a width and thickness suitable for pizza crust, flour tortilla, noodles, macaroni or biscuits without further processing. Individual segments of dough could thereafter be hand stretched but the high labor content made the end product expensive. Alternatively, rollers could be used to further stretch the dough, but this increased the capital requirement for machinery, raising the expense. Often the dough stuck to the rollers, requiring expensive shut downs and/or intervention of hand operations to clear the fault. Also, with previous extrusion and spreading means, the dough would break up into lumps. Or where the dough jammed in the extruder, the resulting friction of the agitated dough would generate heat and cause it to cook in the spreader, mixer and kneader. Furthermore, without further processing, dough agitated and extruded by the above described means contains a great deal of occluded gases, which might detrimentally reduce the shelf life, that is the storage time permissible before consumption, as well as result in dough of inferior texture and quality.

SUMMARY OF THE INVENTION

It is the principal object of the present invention to provide an improved dough sheet spreader through which dough may be rapidly and continuously extruded in sheets of predetermined width and thickness, thereby eliminating intermediate hand or machine processing operations heretofore necessary before cutting and cooking the dough in final dimensions as required for pizza, tortilla or the like. Another object is to provide novel means for the removal of occluded gases within the dough, thereby increasing the shelf life of the end product and producing dough of improved texture and quality.

The above and other objects of the present invention are achieved by utilization of a dough sheet spreader of a generally triangular configuration, having a hollow passageway therein, through which dough is extruded. The inlet is arranged near the apex of the triangular structure and the egress at the base. The passageway is outwardly flaring, but narrowing in height, from inlet to egress, the lips of which are lined with release material, such as Teflon to prevent sticking of the dough. In operation the spreader housing distends downwardly from the horizontal, optimum results being achieved at an angle of approximately thirty degrees (30°) from the vertical or sixty degrees (60°) from the horizontal. Combination means for varying dough sheet thickness, and sealing the mixing, kneading and extrusion system between runs may be provided. This latter feature permits rapid conversion of the spreader to differing products and also permits shut down and start up without laborious and expensive cleaning operations, because the system is sealed to outside factors during shut down. As an additional feature, means for removing occluded gases within the dough are provided within the spreader. In an illustrated embodiment, a spring-biased degassing plate is arranged within the spreader passageway between the inlet and the egress. The degassing plate surface is in touching relationship with the flow of dough through the passageway. The spring-biased up and down movement of the plate against the variable density flowing dough serves to drive out gas which was entrained during the mixing and kneading operations, thereby increasing the shelf life of the dough and improving the texture and quality. The outwardly flaring, and downwardly distending features of the present invention have been found to: make dough extrusion more rapid and easier; minimize, if not eliminate, the breaking of cold dough into lumps; prevent the jamming of the spreader with resultant agitation and cooking of the dough within the system; and eliminate the need for hand operations or a plurality of roller means for processing the dough into final shapes. Instant shut down and start up means, eliminating the need for intermediate cleaning have also been achieved, as well as means for removing entrapped gases in the dough and thereby improving its texture, quality and shelf life.

Another feature of the dough sheet spreader of the present invention offers a choice of dough sheet widths and thicknesses in a plurality of discreet, progressive steps by utilization of an adjustable roller pair, each carrying a plurality of cooperating release bars at the egress of the spreader. Each of the rollers carries a plurality of equi-spaced bars of a release material, the bars of one roller being notched to various widths to receive corresponding bars of the other roller which selectively nest to predetermined depths to form a die having an opening of desired width and height made of release material, though which dough is extruded in a sheet of the desired dimensions.

DESCRIPTION OF THE PREFERRED EMBODIMENTS

Figure 1:
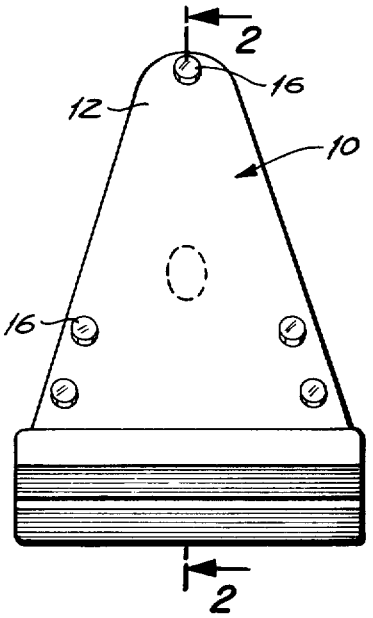
FIG. 1 is a front elevation of the improved spreader of the present invention.
Figure 2:
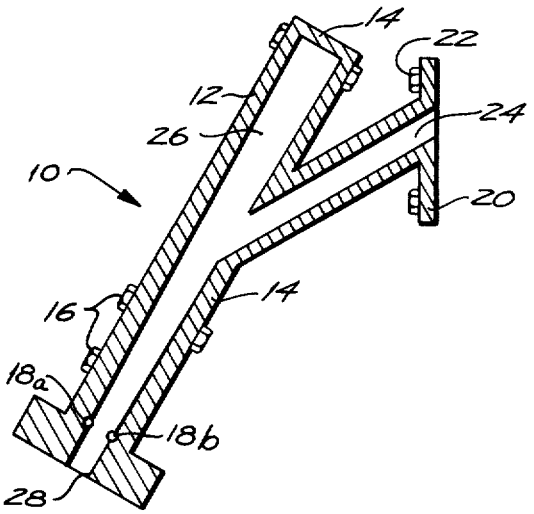
FIG. 2 is a sectional view taken along section lines 2—2 of FIG. 1.

A species of the present invention arranged to process dough in sheets of fixed thicknesses and width is shown in FIGS. 1 and 2. A spreader vesssel 10 having a flange 20 is mounted at the end of a passageway 24 from which dough is driven forward by screw or other means, not shown as being conventional in the food extruder and baking art. The spreader 10 comprises a housing 14 and a cover plate 12 which generally define a downwardly distending outwardly flaring passageway 24 having an egress 28, the lips of which are lined with release bars 18a, 18b, of a material such as Teflon. The cover plate 12 is held to the spreader housing 14 by securing bolts 16 and the spreader housing 14 attached to the associated machinery by bolts 22 extending through the mounting flange 20, or some other suitable means.

In operation, the mixed dough is moved forward into the passageway 24 and then downward into the spreader chamber 26. The chamber 26, being of a generally outwardly flaring configuration, and being downwardly distended at approximately thirty degrees (30°) from the vertical, or sixty degrees (60°) from the horizontal, may or may not be Teflon lined, and becomes more restricted as it approaches the egress 28. The dough fans out to a width and thickness as finally determined by the configuration of the egress 28 formed by the cover plate 12 and housing 14. The lip bars 18 act in the manner of a mold release agent to afford smooth exit of the dough from the spreader 10 onto a receiving means, such as a conveyor belt, for further processing. It has been found that the use of the outwardly flaring extrusion means, downwardly canted at about thirty degrees (30°) from the vertical, or sixty degrees (60°) from the horizontal, having lip bars 18, all as shown in the present spreader 10 has resulted in a continuous, smooth, even flow of dough without jamming and precooking or lumping. The operation in this manner has enabled spreading dough in widths and thicknesses not heretofore readily accomplished by machine. When dough is so dimensioned to sizes utilized in special regional food specialties such as tortillas, special hand processing is no longer required. The result is that the final product can be produced in great quantities and more cheaply, with resultant benefits to the consuming public.

Figure 5:
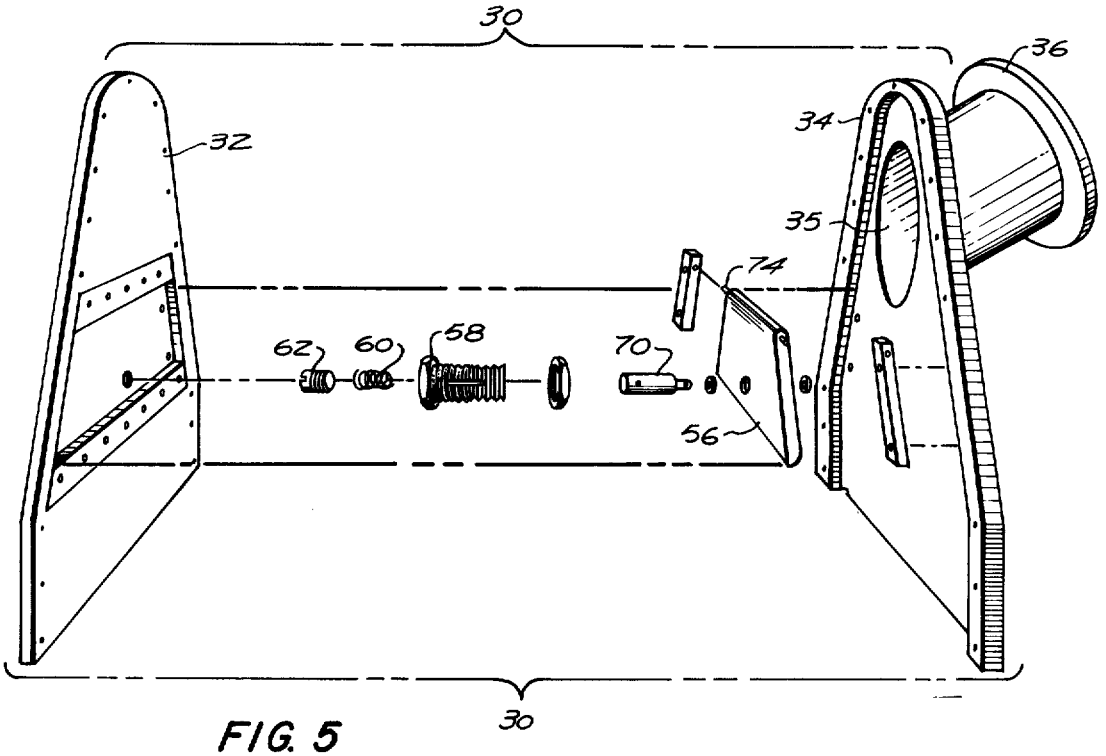
FIG. 5 is a partial exploded view showing the relationship of the degassing plate to the spreader assembly and cover plates.
Figure 3:
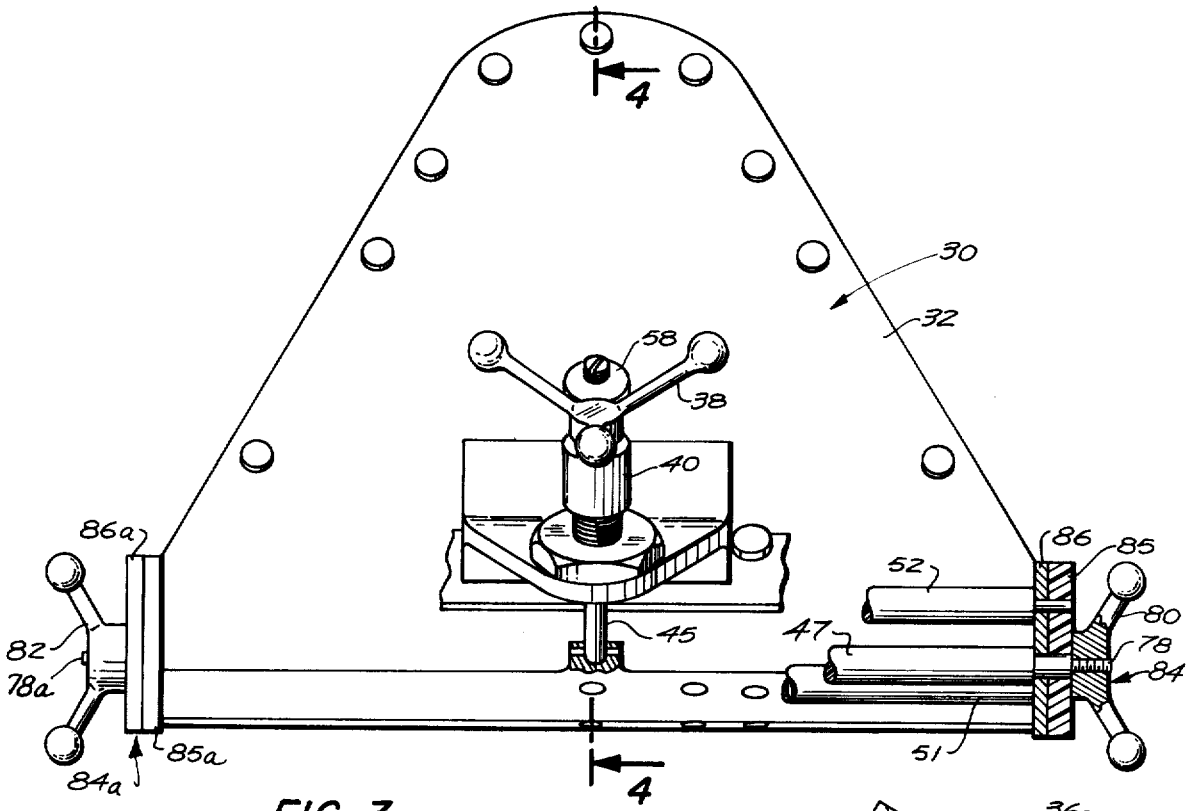
FIG. 3 is a front elevation of a modification of the present invention incorporating a combination sealer and thickness control.
Figure 4:
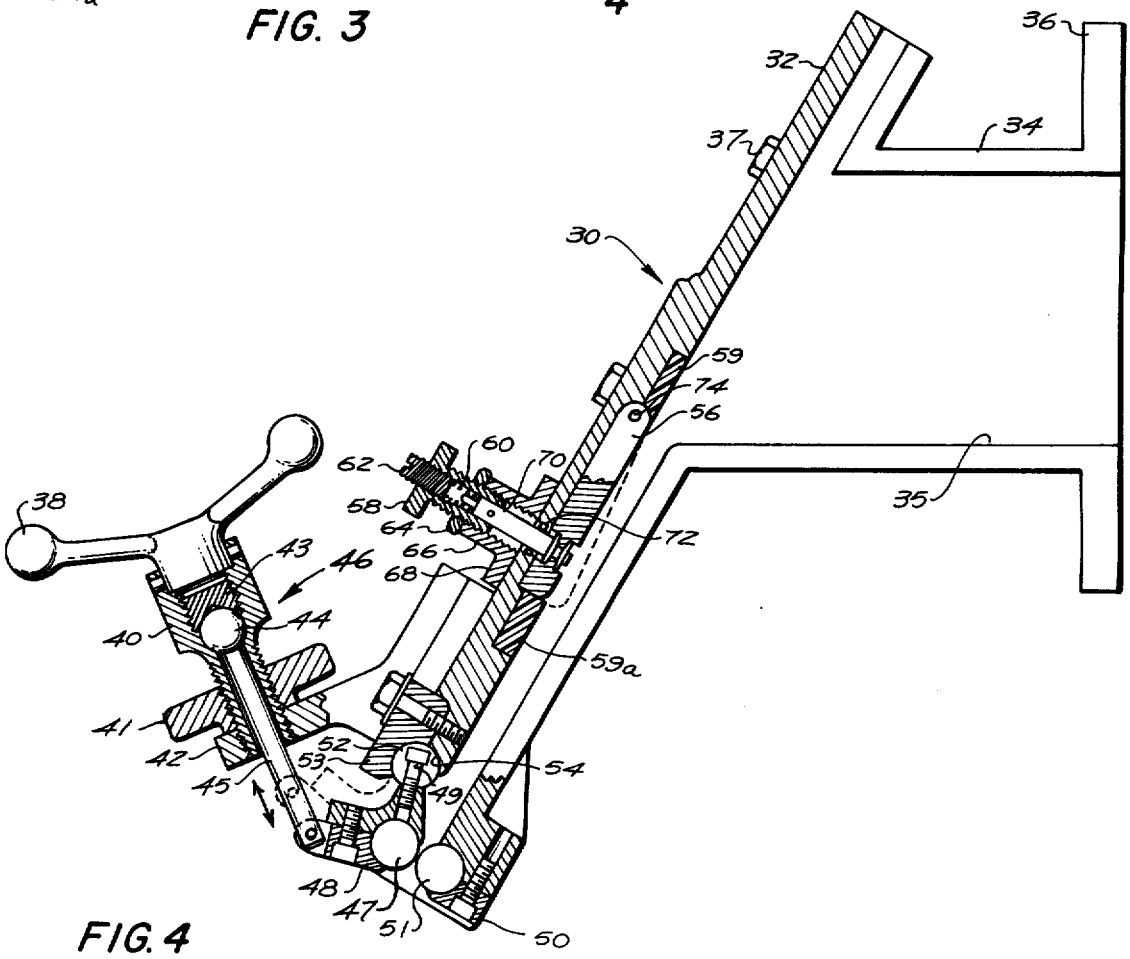
FIG. 4 is a sectional view taken along section lines 4—4 of FIG. 3 and additionally illustrating the dough degassing means.

Dough processed by the spreader of this invention, such as tortillas, is often stored by distribution agencies, including retailers for an indefinite time before being purchased by the ultimate consumer. It has been found that if the presence of gas in the dough, entrapped during mixing and processing, is minimized, the dough such as tortilla shells will stay fresh longer, resulting in more efficient utilization of the product and greater customer satisfaction. The species shown in FIGS. 3, 4 and 5 contain special features directed to the diminution of such gases in the dough. This species also features variable means for adjusting dough sheet thickness and sealing the spreader between runs. As shown in the Figures, the spreader 30 comprises a housing 34 which together with the cover plate 32 form a passageway 35, said spreader being adapted to mount to conventional dough mixing and kneading equipment by a mounting flange 36. The cover plate 32 is joined to the housing 34 by securing means 37, such as bolts. The thickness of the dough sheet may be determined by positioning the adjustable rod assembly 46 relative to the fixed rod assembly by adjustment of the handle 38 which is connected to an adjustable rod holding member 48 containing an upper lip rod 47 made of Teflon or the like, said handle 38 being connected to move rod 45, through an adjustable link 44 held by a set screw 43, along its longitudinal axis thereby causing the rod holding member 48 to turn about its pivot point 49 by rotating pivot rod 52 in its socket 54. As shown in the Figures, the handle 38 is arranged within the hollow interior portion of the bushing 40, which is threadably mounted within a jam nut 41 which is itself mounted on a support bracket 42 mounted on the pivot rod retaining plate 53 arranged on the spreader cover plate 32. The fixed rod assembly 50 contains a lower lip rod 51, made like the upper lip rod 47 of a release material, and their relative position determines the thickness of the sheets of dough. The pivot rod 52 and fixed and adjustable rod assemblies 50, 46 are prevented from lateral motion by sealing plate assemblies 84, 84a which comprise a plate at each end of Teflon 85 and steel 86 bonded together, which is held in place by removable handles 80, 82 bearing on the sealing plate assemblies 84, 84a and threadably mounted on screws 78, 78awhich extend from the ends of the adjustable rod assembly 46. This ability to set the upper and lower lip rods 47, 51 in an air tight relationship is extremely valuable as it obviates the necessity of completely cleaning out the system after shut down and before restarting. It greatly diminishes the amount of time attributed to cleaning and set up, and permits application of an optimum amount of operating time to dough production.

The thickness of the dough being extruded is adjusted by loosening the handles 80, 82 and the sealing plate assemblies 84, 84a, then adjusting the adjustable rod assembly 46 by moving the handle 38 in or out as desired. When the desired relationship between the adjustable rod assembly 46 and the fixed rod assembly 50 is achieved, the sealing plate assemblies 84, 84a and the end handles 80, 82 are retightened.

It has been found that the texture, quality and shelf-life of the dough is improved if the gas content is reduced to a minimum. This is especially true of the flour tortilla. While the screw action which normally forces dough through an extruder may accomplish a small amount of degassing, it has been found that additional means are necessary to provide superior results. Such additional means are provided herein by an adjustable yielding degasser plate, the use of which will afford the right texture to the dough as required for high quality flour tortillas. As shown in the Figures, an adjustable degasser plate 56 is positioned to move inwardly in or out of the passageway 35 as it swings about its pivot point 74. Teflon seals 59, 59a abut the plate 56 in its withdrawn position to prevent entrapment of the moving dough around and behind the degasser plate 56. The plate 56 is initially placed within the passageway 35 to the desired depth by a connecting rod member 70 abutting a spring 60, the compression of which is adjusted by a screw 62, all of which are arranged within the bore of a degassing plate positioning bushing 58 which is threadably mounted in the neck 66 of a bushing flange 68 arranged on the surface of the spreader cover plate 32. A jam nut 64 holds the positioning bushing 58 while an O-ring seal 72 surrounds the connecting rod member 70 where it passes through the spreader cover plate 32, and together with the other seals serves to prevent the dough from leaking from the spreader 34. In operation, the pressure of the spring-biased degassing plate 56 in touching, tangential relationship to the dough as it flows through the spreader passageway 35 squeezes entrained gases from the dough. The spring-biased up and down movement of the plate 56 affords operation in spite of irregularities in dough density as it flows by the plate 56. The plate 56 remains at a fixed position as the dough density remains constant, but as the density increases, the plate 56 is pushed upward against the biasing spring 60 which exerts a counter force, causing the plate 56 to press gases from the dough. In some instances the plate 56 can also serve the function of predimensioning the dough before it reaches the final extrusion die formed by the upper lip rod 47 and the lower lip rod 51 of the adjustable rod assembly 46 and fixed rod assembly 50.

By simple modification of the dough sheet spreader of the present invention, particularly the egress portion, it is possible to choose dough sheet widths and thicknesses in a plurality of discrete progressive steps. This feature is realized by utilizing at the spreader egress, an adjustable roller pair, each carrying a plurality of cooperating release bars. As illustrated further in FIGS. 6, 7, 8 and 9 the upper, or thickness selector, roller 100 and the lower, or width selector, roller 102, each carry a plurality of equi-spaced bars of release material, the bars of the width selector roller 102 being notched to various widths to receive corresponding bars of the thickness selector roller 100 which selectively nest to predetermined depths to form a die of desired width and height made of release material, such as Teflon, through which dough is extruded in a sheet of desired dimensions.

Figure 6:
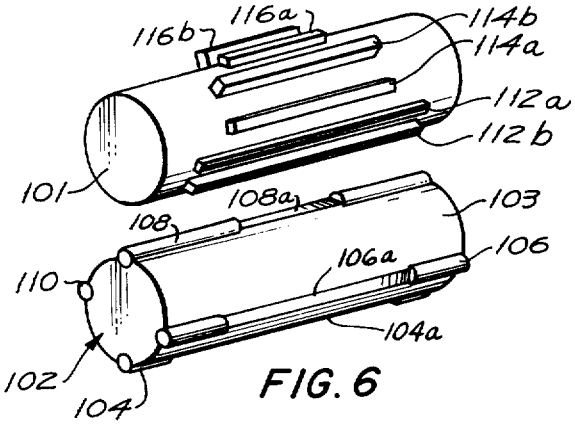
FIG. 6 is a perspective view of the overall relationship of the adjustable roller paid, each carrying a plurality of cooperating release bars functioning as an extrusion die of variable width and thickness.
Figure 7:
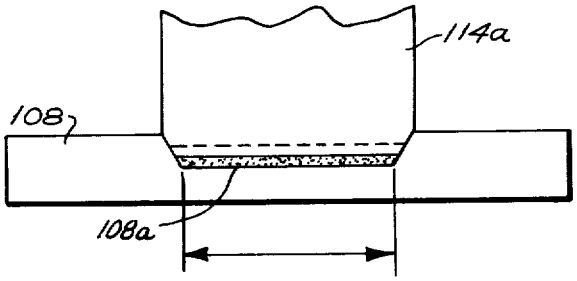
FIG. 7 illustrates the nesting of a thickness selector roller bar into a width selector bar to form a die.
Figure 9:
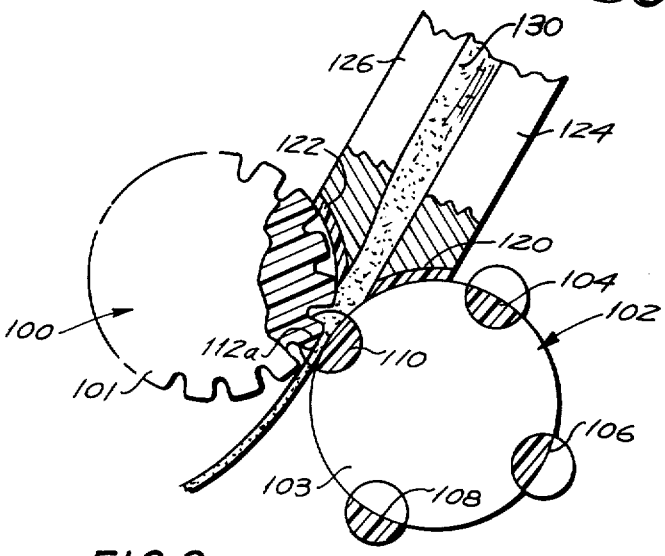
FIG. 9 is a sectional view taken along section lines 9—9 of FIG. 8.

By way of example, the width selector roller 102 shown in FIG. 6 has four bars 104, 106, 108, 110, each mounted on the roller drum 103 and made of a release material such as Teflon. Each bar is notched as shown in FIGS. 6 and 7, the indentations 104a, 106a, 108a being widest at the top surface of the bar and tapering inwardly, so it is narrowest at the floor of the indentation. In a preferred embodiment the width of the first bar 104 was sixteen inches at the narrowest portion of the indentation, the second bar 106 was twelve inches, the third bar 108 was ten inches and the fourth bar 110 was eight inches. The number of bars and the width of the respective indentations is limited only by the dimensions of the drum 102 and the bars themselves. The thickness roller 100 has arranged on the drum 101 a plurality of outwardly extending step bars arranged to match the several width bar indentations in a manner to be heretofore described. The outwardly extending step bars are arranged in sets, each set having one or more bars. The number of sets is equal to the number of notched bars on the width selector roller 102. The bars in each set are of identical width but of a different radius, the bars of each set being adapted to nest into a corresponding notched bar but, being of a different radius, each to a different depth. When nested in the corresponding notched bar, the combination provides an extrusion die providing dough sheet thickness which depends upon which of the two or more outwardly extending step bars has been selected. By way of example, and as shown in FIG. 6, a pair of outwardly extending step bars 112a, 112b are provided to nest in the fourth or narrowest notched bar 110; another pair of outwardly extending step bars 114a, 114b are provided for nesting with the next narrowest notched bar 108. Similarly a step bar pair 116a, 116b are provided for use with the next notched bar 106, and the widest step bar pair (not shown) are provided for use with the widest notched bar 104. While only two bars per set are shown, the actual number is limited only by the dimensions of the drum 101 on which they are mounted and the bars themselves, provided that each alternate bar be of a constant radius. As best shown in FIG. 9, this expedient provides a seal with the upper Teflon pad 122, preventing leakage of dough from the system.

Figure 8:
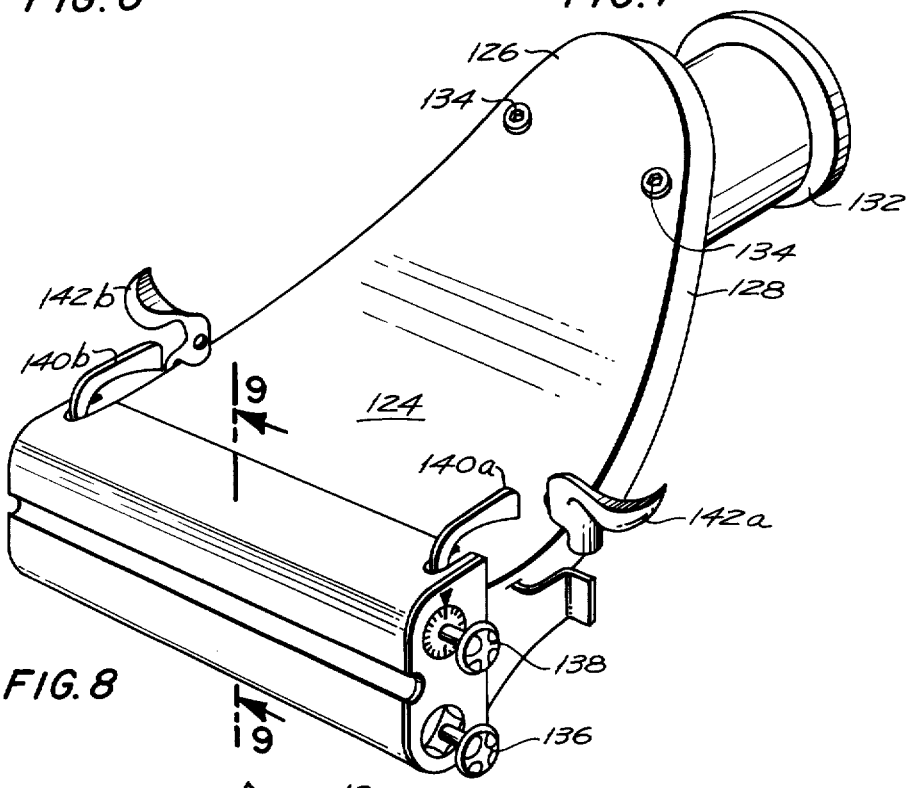
FIG. 8 is a front elevation of a dough spreader having said variable width and thickness control.

FIGS. 8 and 9 illustrate a practical embodiment of the principles illustrated in connection with FIGS. 6 and 7. A variable width, variable thickness spreader 124 having a cover plate 126 attached to a spreader housing 128 by cover securing means 134, such as bolts, which together form a passageway 130, is adapted to connect to conventional screw or other type dough mixing and kneading means, such as by a mounting flange 132. An upper, or thickness selector, roller 100 and a lower, or width selector, roller 102 are mounted on the lower end of the passgeway 130, the Teflon bars on each, together forming a die at the egress through which the dough is finally extruded in sheets. The width selector roller 102 shown in FIG. 9 has four notched bars 104, 106, 108, 110 mounted on the width roller drum 103 as previously described in connection with FIG. 6. The drum 103 bears against the lower Teflon pad 120 to effect a seal. However the thickness selector roller 100 is shown as having sixteen bars or four sets of four bars. Since each alternate bar is of constant radius to effect a constant seal with the upper Teflon pad 122, it is seen that this combination affords a choice of two thicknesses for each of four widths. Thus, in FIG. 9, outwardly extending step bar 112a nests in notched bar 110 to form an eight inch die through which dough may be extruded.

In operation, the desired thickness is selected by manipulation of the calibrated thickness selector knob 138 which is connected to the thickness roller 100, and the desired width is selected by the calibrated width selector knob 136 which is connected to the width selector roller 102. Thereafter roller clamping levers 140a, 140b are activated to wedge the selected step bar 112a into the matching notch on bar 110, thereby sealing all mating surfaces. The roller clamps may take any of the forms well known in the art to provide a compressive force on the roller assemblies to urge the step bar 112a into the matching notch on bar 110, such as a screw type clamp, like in a vise, or a lever associated with clamp jaws moving along a ramp and in and out of a locked position, or many other expedients well known to those skilled in the mechanical arts. Thereafter the roller assemblies 100, 102 are pivoted about the axis of the thickness selector roller 100 and clamped tightly in place by another pair of clamps 142a, 142b thereby making a seal of the rollers 100, 102 against the Teflon plates 122, 120 at the egress of the spreader housing 128. The dough is thereafter driven through the passageway 130 and through the extrusion die formed by the roller assemblies 100, 102, in a sheet of desired width and thickness. The spreader shown may also contain the degassing feature as illustrated in connection with FIGS. 3 and 4. By utilization of the device as described it is possible to vary the width and thickness of the dough sheet in progressive, finite steps to approximate the dimensions of the end product to be made from the dough being processed. Thus, the spreader can be quickly and simply converted from the processing of tortilla dough to the processing of pizza dough, each of which products have significantly differing dimensions. The dough extruded from the spreader of the present invention will then approximate the dimensions of the end product, and intermediate processing for size, whether by hand or machine, is eliminated with resulting economic benefit.

It is also possible to couple the width selector roller 102 with the thickness roller 100 through a gear system like a Geneva Drive or other intermittent drive so that the corresponding thickness set is always automatically coupled to each particular width.

We claim:

1. A sheet spreader for viscous material comprising: an enclosed vessel having an inlet and an egress connected by an interior passageway for the movement of viscous materials therethrough, said passageway being so dimensioned as to diverge generally outwardly in a first plane and to converge generally inwardly in a plane normal to said first plane as the passageway progresses from said inlet toward said egress, said vessel egress comprising an extrusion die means, means for mounting said vessel so that the longitudinal axis of said passageway distends downwardly at about 60° from the horizontal, and in addition, means associated with said vessel for removing entrained gases from said viscous material being extruded prior to extrusion through said die means, said degassing means extending into said passageway between said inlet and said egress and comprising a plate extending in a biased, touching relationship to the material moving through said passageway and adapted to move in a direction substantially normal to the flow of material through the passageway in accordance with the variations in the material density, whereby variable movement of said plate against said material will drive out the gases entrained therein.

2. A sheet spreader for viscous material comprising: an enclosed vessel having an inlet and an egress connected by an interior passageway for the movement of viscous materials therethrough, said passageway being so dimensioned as to diverge generally outwardly in a first plane and to converge generally inwardly in a plane normal to said first plane as the passageway progresses from said inlet toward said egress, means for mounting said vessel so that the longitudinal axis of said passageway distends downwardly at about 60° from the horizontal, said egress including an extrusion die means comprising an adjustable cooperating roller pair, the first roller of which contains a plurality of bars of differing dimensions on the outer periphery thereof, said bars each having an indentation in the mediate portion thereof, and the second roller of which contains a plurality of bars on the outer periphery thereof, each of said first and second roller bars being dimensioned so that at least one of them fixedly and partially nests into the indentation of a corresponding first roller outwardly extending bar in sealing relationship to form a die through which viscous material may be extruded.

[3. An extrusion die for viscous material fed thereinto under pressure comprising: an adjustable cooperating roller pair, the first roller of which contains a plurality of bars of differing dimensions on the outer periphery thereof, said bars each having an indentation in the mediate portion thereof, and the second roller of which contains a plurality of bars on the outer periphery thereof, said first and second roller bars being so dimensioned that at least one second roller bar fixedly and partially nests into the indentation of a corresponding first roller bar in sealing relationship to form a die through which viscous material under pressure may be extruded.]

[4. A device as set forth in claim 3 wherein the second roller bars comprise a plurality of sets of bars, each set having at least two bars therein, the bars of each set being of constant length as measured in a direction parallel to the axis of rotation of the roller, and of a preselected height.]

[5. A device as set forth in claim 3 wherein the bars on the outer periphery of the adjustable cooperating roller pair are made of a release material to which the viscous material to be extruded will not adhere.]

* * * * *